United States Patent
Wendt et al.

(10) Patent No.: US 10,980,097 B2
(45) Date of Patent: Apr. 13, 2021

(54) POWER SOURCE EQUIPMENT DEVICE FOR A POWER OVER ETHERNET LIGHTING SYSTEM

(71) Applicant: SIGNIFY HOLDING B.V., Eindhoven (NL)

(72) Inventors: Matthias Wendt, Eindhoven (NL); Ulrich Boeke, Eindhoven (NL); Leenart Yseboodt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/753,403

(22) PCT Filed: Aug. 16, 2016

(86) PCT No.: PCT/EP2016/069396
§ 371 (c)(1),
(2) Date: Feb. 19, 2018

(87) PCT Pub. No.: WO2017/029275
PCT Pub. Date: Feb. 23, 2017

(65) Prior Publication Data
US 2018/0249556 A1    Aug. 30, 2018

(30) Foreign Application Priority Data
Aug. 20, 2015 (EP) .................................... 15181686

(51) Int. Cl.
*H05B 47/18* (2020.01)
*H04L 12/10* (2006.01)
(Continued)

(52) U.S. Cl.
CPC ............ *H05B 47/18* (2020.01); *H02J 9/02* (2013.01); *H02J 9/061* (2013.01); *H04L 12/10* (2013.01);
(Continued)

(58) Field of Classification Search
CPC . G06F 1/30; H04L 12/10; H04L 12/12; H04L 12/2827; H04L 12/40045;
(Continued)

(56) References Cited

U.S. PATENT DOCUMENTS

| | | | |
|---|---|---|---|
| 7,478,251 B1* | 1/2009 | Diab | G06F 1/189 307/38 |
| 9,370,078 B2* | 6/2016 | Feri | H05B 47/185 |
| 10,327,305 B2* | 6/2019 | Picard | H05B 45/37 |
| 2005/0272402 A1* | 12/2005 | Ferentz | G06F 1/30 455/402 |

(Continued)

FOREIGN PATENT DOCUMENTS

| | | |
|---|---|---|
| CN | 102986301 A | 3/2013 |
| CN | 103384200 A | 11/2013 |

(Continued)

OTHER PUBLICATIONS

Das ABC fur die Schweizerische Notebeleuchtung.

*Primary Examiner* — Borna Alaeddini
(74) *Attorney, Agent, or Firm* — Daniel J. Piotrowski (57) ABSTRACT

The invention relates to a PSE device (2) to be used in a PoE lighting system (1), wherein the PSE device (2) is adapted to receive input power from a power providing system (7). The PSE device (2) comprises a power detection unit for detecting whether the received input power is primary input power or backup input power, wherein the PSE device (2) is adapted to control the power consumption of lighting units (31, 32) depending on the power detection. This allows for an indication of an emergency situation, in which the backup input power is provided, to the PSE device (2) without necessarily requiring data communication means. Moreover, the power consumption of the lighting units (31, 32) can be more efficiently utilized in case of emergency.

14 Claims, 5 Drawing Sheets

(51) Int. Cl.
  *H04L 12/12* (2006.01)
  *H04L 12/28* (2006.01)
  *H04L 12/40* (2006.01)
  *H02J 9/02* (2006.01)
  *H02J 9/06* (2006.01)

(52) U.S. Cl.
  CPC .......... *H04L 12/12* (2013.01); *H04L 12/2827* (2013.01); *H04L 12/40045* (2013.01); *Y02D 30/50* (2020.08)

(58) Field of Classification Search
  CPC . Y02D 50/40; Y02D 50/42; H02J 9/02; H02J 9/061; H05B 47/18
  See application file for complete search history.

(56) References Cited

U.S. PATENT DOCUMENTS

| | | | |
|---|---|---|---|
| 2007/0103834 A1 | 5/2007 | Huang et al. | |
| 2012/0080944 A1* | 4/2012 | Recker | H05B 33/0803 307/25 |
| 2014/0172133 A1 | 6/2014 | Synder | |
| 2015/0195883 A1* | 7/2015 | Harris | H05B 33/0845 315/155 |

FOREIGN PATENT DOCUMENTS

| | | |
|---|---|---|
| CN | 203387730 U | 1/2014 |
| EP | 2819344 A1 | 12/2014 |
| WO | 2005109154 A2 | 11/2005 |
| WO | 2008134433 A1 | 11/2008 |
| WO | 2014111824 A2 | 7/2014 |

* cited by examiner

POWER SOURCE EQUIPMENT DEVICE FOR A POWER OVER ETHERNET LIGHTING SYSTEM

CROSS-REFERENCE TO PRIOR APPLICATIONS

This application is the U.S. National Phase application under 35 U.S.C. § 371 of International Application No. PCT/EP2016/069396, filed on Aug. 16, 2016 which claims the benefit of European Patent Application No. 15181686.5, filed on Aug. 20, 2015. These applications are hereby incorporated by reference herein.

FIELD OF THE INVENTION

The invention relates to a power source equipment (PSE) device to be used in a Power of Ethernet (PoE) lighting system. The invention further relates to a PoE lighting system comprising the PSE device, a method for providing power by using the PSE device in the PoE lighting system and a computer program for controlling the PSE device.

BACKGROUND OF THE INVENTION

WO 2014/111824 A2 discloses a track based DC power distribution system for providing main DC power from a main DC power source to an electrical consumer connected to the track. The DC power distribution system comprises an auxiliary DC power source device which, when the voltage on the track is below a threshold, will provide auxiliary power to the electrical consumer.

WO 2008/134433 A1 discloses a PoE lighting system comprising lighting units connected to a PSE device via Ethernet cables, wherein the PSE device is connected to a server. In a normal operation mode the server receives power from an alternating current (AC) voltage source, the PSE device receives power from the server and the lighting units receive power from the PSE device. In case of emergency, i.e. if the AC voltage source does not provide power anymore, the server may receive power from a battery such that the server can still provide power to the PSE device and the PSE device can provide power to the lighting units. Moreover, in case of emergency the lighting units can receive power from batteries directly connected to the lighting units.

In case of emergency the providable power is strongly limited due to the capacity of the batteries such that after a certain time the providable power will be depleted and the lighting units may not provide light anymore.

SUMMARY OF THE INVENTION

It is an object of the present invention to provide a PSE device to be used in a PoE lighting system, which allows for a prolonged provision of light in case of emergency. It is a further object of the present invention to provide a method for providing power by using the PSE device, a computer program for controlling the PSE device, and a PoE lighting system comprising the PSE device.

In a first aspect of the present invention a PSE device to be used in a PoE lighting system is presented, wherein the PSE device is adapted to receive input power from a power providing system which is adapted to provide primary input power or backup input power, wherein the PSE device comprises:

a power detection unit for detecting whether the received input power is the primary input power or the backup input power, an output power providing unit for providing output power to lighting units based on the received input power, and a control unit for controlling the power consumption of the lighting units depending on whether the received power is the primary input power or the backup input power.

If the power providing system provides the backup input power only, it is assumed that the primary input power cannot be provided anymore due to an emergency situation. Since the PSE device comprises a control unit for controlling the power consumption of the lighting units depending on whether the received power is the primary power or the backup power, the PSE device comprises a control functionality which allows for an adaptation of the power consumption of the lighting units to the emergency situation in which the backup input power is received by the PSE device. This allows for an improved utilization of the limited power available in emergency situations such that the time period, during which emergency lighting can be provided, can be prolonged. Moreover, since the emergency situation is detected by monitoring the received input power, the PSE device can be notified of the emergency situation without necessarily requiring additional communication means for communicating to the PSE device that the emergency situation has occurred.

The lighting units are preferentially powered devices (PDs) in accordance with the PoE standard. Moreover, the PoE lighting system can comprise further electrical devices, in particular, further PDs, which are not lighting units, like sensors, hand switches for switching the lighting units, heating, ventilation, air conditioning (HVAC) equipment, hardware for computer systems, et cetera. The power detection unit can be a measuring unit for measuring the received input power. For instance, the power detection unit can be adapted to measure the voltage and the current, in order to detect whether the received input power is the primary input power or the backup input power.

The output power providing unit preferentially comprises a power converter for converting the received input power to the converted power. Moreover, the output power providing unit is preferentially adapted to provide power to several lighting units and comprises a power distribution unit for distributing the converted power among the lighting units. The converted distributed power is the provided output power.

The PSE device is preferentially adapted to receive AC power as primary input power and DC power as backup input power. In particular, the primary input power is AC mains power being, for instance, 230 V AC power, and the backup input power is preferentially DC power within the range of 200 to 250 V. The power providing system can comprise a primary input power source, a backup input power source and a switching unit which may comprise a relay. The switching unit may be arranged between a) the primary and backup input power sources and b) PSE device and it may be adapted to put the primary input power through, if the primary power source provides power within a predefined primary power range, and to put the backup input power through, if the primary input power source does not provide power within the predefined primary power range. In particular, if the primary input power vanishes, the backup input power may be put through. The primary input power source may be a mains power source and the backup power source may be a battery bank.

The PSE device is preferentially adapted to receive the input power via a single input power conductor. Thus, the same input power conductor can be used for receiving the primary input power and the backup input power. This leads to a simplified wiring for providing the input power to the PSE device. The input power conductor is, for instance, a mains wire via which generally mains power is provided.

In an embodiment the control unit is adapted to control the power consumption of the lighting units by sending control data to the lighting units. The control data may be indicative of the power to be consumed by the respective lighting unit, when the power detection unit has detected that the received input power is the backup input power. The control data can be direct control data which directly include, for instance, power levels to be used by the respective lighting unit, wherein the control unit may send to at least one of these lighting units control data which are different to control data sent to at least one other of the lighting units. For instance, in case of emergency, to some of the lighting units control data can be sent, which request the lighting units to switch themselves off, and to other of the lighting units control data can be sent, which request the lighting units to be operated in a dim mode, in order to still provide some light, wherein the latter lighting units may be regarded as being emergency lighting units. However, the control data can also be indirect control data, i.e. the control data may just inform the lighting units that an emergency situation has occurred, i.e. that backup input power has been detected, whereupon, for instance, some lighting units may go into an emergency mode in which they consume a reduced amount of power only, i.e. they may be operated with a dimmed light intensity, and other lighting units may just switch off themselves or go into a standby mode, in which they do not provide light anymore, but consume very little power for providing some basic functionalities like communication and simple control functionalities. Thus, in an embodiment the lighting units are adapted to be operated in a first mode, which may be regarded as being a normal operation mode and in which the lighting units consume first power, and in a second mode, which may be regarded as being an emergency mode and in which the lighting units consume second power being smaller than the first power or no power, wherein the control unit is adapted to send control data to the lighting units, which indicate that the lighting units should be operated in their second mode, if the power detection unit has detected that the received input power is the backup input power. The lighting units may be classified into at least two classes, wherein lighting units of different classes may have different second modes. For instance, the lighting units may be either emergency lighting units or non emergency lighting units, wherein the second mode of the emergency lighting units may define that they should be operated with a dimmed light intensity level in case of emergency and wherein the second mode of the non emergency lighting units may define that they should be switched off or operated in a standby mode in case of emergency. In an embodiment the second modes are configurable, especially by an installer. Thus, it can be configured which lighting units should act as emergency lighting units and which lighting units should act as non emergency lighting units. The lighting units may comprise an installer operable button or another input unit which allows the installer to configure whether the respective lighting unit should act as an emergency lighting unit or as a non emergency lighting unit.

In an embodiment the control unit is adapted to a) send information data to a lighting unit connected to a port, to which power will be provided, if the power detection unit detects that the received input power is the backup input power, wherein the information data indicates that the lighting unit is connected to the port to which power will be provided, if the power detection unit detects that the received input power is the backup input power, and b) send, if the backup input power has been detected, control data to the lighting unit informing the lighting unit that backup input power has been detected, in order to allow the lighting unit to control itself based on the knowledge that power will still be provided and backup input power has been detected. Thus, the information which lighting unit should act as an emergency lighting unit and which lighting unit should act as a non emergency lighting unit can be provided by the PSE device. Emergency lighting units, i.e. lighting units connected to a port which will receive power in case of emergency, can control themselves to be in an emergency mode in which a dimmed light intensity is provided only. Moreover, non emergency lighting units can switch off themselves, if the received control data indicate that an emergency situation has occurred.

In an embodiment the control unit is adapted to control the power consumption of the lighting units by controlling the output power providing unit. In particular, the output power providing unit may comprise several ports to be connected to several lighting units for providing the output power to the several lighting units, wherein the control unit may be adapted to control the output power providing unit such that not to all ports output power is provided, if the power detection unit has detected that the received input power is the backup input power. This allows the PSE device to control the power consumption of the lighting units in a technically relatively simple way, without necessarily requiring sending control data to the lighting units.

In an embodiment the control unit is adapted to randomly determine to which ports the output power should be provided, if the power detection unit detects that the received input power is the backup input power, and to control the output power providing unit such that only to the determined ports output power is provided, if the power detection unit has detected that the received input power is the backup input power. Moreover, in an embodiment the control unit is adapted such that the ports to which the output power should be provided, if the power detection unit detects that the received input power is the backup input power, are predefined, wherein the control unit is adapted to control the output power providing unit such that only to the predefined ports output power is provided, if the power detection unit has detected that the received input power is the backup input power.

The ports, to which the output power should be provided, if the power detection unit detects that the received input power is the backup input power, may be regarded as being emergency ports. The emergency ports can be fixed, i.e. it may not be amendable to which ports the output power should be provided, if the port detection unit detects that the received input power is the backup input power, and to which ports the output power should not be provided in this case. This allows for a relatively simple installation of the PSE device within a PoE lighting system, because it is not required to define which ports should output power and which ports should not output power in case of emergency. Also a restart of the PSE device is relatively simple, because after the restart a configuration of the ports with respect to the output power provision in case of emergency is not required. The PSE device may comprise indications for indicating the predefined emergency ports. This allows an installer to very easily recognize which ports will receive power and which ports will not receive power in case of emergency. The lighting units arranged in regions, which require light in case of emergency, just need to be connected to the ports marked by the indications. The indications may be colored markers. They may especially be colored markers surrounding the respective port.

In an embodiment the control unit is adapted such that the ports to which the output power should be provided, if the power detection unit detects that the received input power is the backup input power, are selectable, wherein the control unit is adapted to control the output power providing unit such that to the selected ports output power is provided, if the power detection unit has detected that the received input power is the backup input power. For instance, the PSE device may be adapted to receive data from, for instance, a building control system or from another system, which might be accessible by, for example, a commissioner of the PoE lighting system, wherein the received data can indicate to which ports output power should be provided and to which ports output power should not be provided in case of emergency. In particular, the PSE device may comprise a default configuration comprising predefined assignments defining to which ports output power should be provided and to which ports output power should not be provided, if it has been detected that the input power is backup input power, wherein this default configuration may be overwritable by using, for instance, the building control system or another system which is accessible by a user like a commissioner and which allows inputting a desired configuration of the ports. The assignments defining the configuration of the ports can be stored in a table in, for instance, the control unit or in a separate storing unit of the PSE device, wherein the table can comprise predefined assignments of the ports, which may be fixed, or which may be amendable, in order to allow a user to select which port should receive output power and which port should not receive output power in case of emergency.

In an embodiment the PSE device comprises a power budget value providing unit for providing a power budget value being indicative of the maximal output power providable by the output power providing unit, if the PSE device receives the backup input power, and a power monitoring unit for monitoring the power consumed by the lighting units, wherein the control unit is adapted to control the power consumption of the lighting units based on the provided power budget value and the monitored consumed power, if the power detection unit has detected that the received input power is the backup input power. This allows controlling the power consumption of the lighting units depending on the power really available in case of emergency, which can lead to an improved power consumption of the lighting units such that, for instance, areas within a building, which need to be illuminated in case of emergency, are illuminated as long as possible.

The provided power budget value can be a predetermined power budget value, which is indicative of the maximum power which is known to be present in case of receiving backup input power, or the power budget value can be determined by measuring the actually received backup input power. The control unit can be adapted to control the power consumption of the lighting units by sending control data to the lighting units, wherein the control data are indicative of the power to be consumed by the respective lighting unit. Alternatively or in addition, the control unit can be adapted to control the power consumption of the lighting units by controlling the output power providing unit.

In an embodiment the control unit is adapted to a) store last control data, which have been sent to the lighting units before the power detection unit has detected that the received input power is the backup input power and before the control unit has controlled the power consumption of the lighting units depending on the detection of the backup input power, and b) send the stored control data again to the lighting unit, if after the detection of the backup input power the primary input power is again detected. This allows the lighting units to be operated in the same way as they have been operated before the backup input power had been detected. The previous lighting configuration can therefore relatively easily and automatically be recovered.

In an embodiment the control unit is adapted to receive backup information, which may also be regarded as being emergency information, from a respective lighting unit, wherein the backup information is indicative of how the lighting unit should be controlled by the control unit, if the power detection unit has detected that the received input power is the backup input power. Thus, the respective lighting unit itself can determine how it should be controlled, if the PSE device receives backup input power only. For instance, the lighting unit itself can determine whether it should be controlled like an emergency lighting unit, which still provides some light in case of emergency, or whether it should just be switched off or be controlled to be in a standby mode in case of emergency. The lighting units may comprise a user operable button or another input unit which allows a user like an installer to configure whether the respective lighting unit should be controlled as an emergency lighting unit or a non emergency lighting unit. The respective lighting unit can then send corresponding backup information to the control unit, in order to inform the control unit whether the lighting unit has been configured to be controlled as an emergency lighting unit or as a non emergency lighting unit.

The PSE device may be adapted to be operable in a test mode, in which the control unit controls the power consumption of the lighting units as if the power detection unit had detected that the received input power is backup input power. In particular, the control unit may be adapted to receive backup test data and to control the power consumption of the lighting units as if the power detection unit had detected that the received input power is backup input power, if the control unit has received the backup test data. It is also possible that the PSE device comprises a hand switch like a button, wherein the PSE device goes to its test mode, if the hand switch is actuated. This allows for a testing of an emergency situation in which the PSE device receives the backup input power only, without requiring the power providing system to simulate this emergency situation by really providing the backup input power only.

In a further aspect of the present invention a PoE lighting system is presented, wherein the PoE lighting system comprises:
  lighting units,
  a PSE device as defined in claim 1, wherein the output power providing unit of the PSE device is adapted to provide the output power to the lighting units.

In a further aspect of the present invention a method for providing power by using a PSE device as defined in claim 1 in a PoE lighting system as defined in claim 13 is presented, wherein the method comprises:

receiving input power from a power providing system, which is adapted to provide primary input power or backup input power, by the PSE device, detecting whether the received input power is the primary input power or the backup input power by a power detection unit of the PSE device, providing output power to lighting units based on the received input power by an output power providing unit of the PSE device, wherein the power consumption of the lighting units is controlled by a control unit of the PSE device depending on whether the received power is the primary input power or the backup input power.

In another aspect of the present invention a computer program for controlling a PSE device as defined in claim 1 is presented, wherein the computer program comprises program code means for causing the PSE device to carry out the method as defined in claim 12, when the computer program is run on the PSE device.

It shall be understood that the power source equipment device of claim 1, the PoE lighting system of claim 11, the method of claim 12 and the computer program of claim 13 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
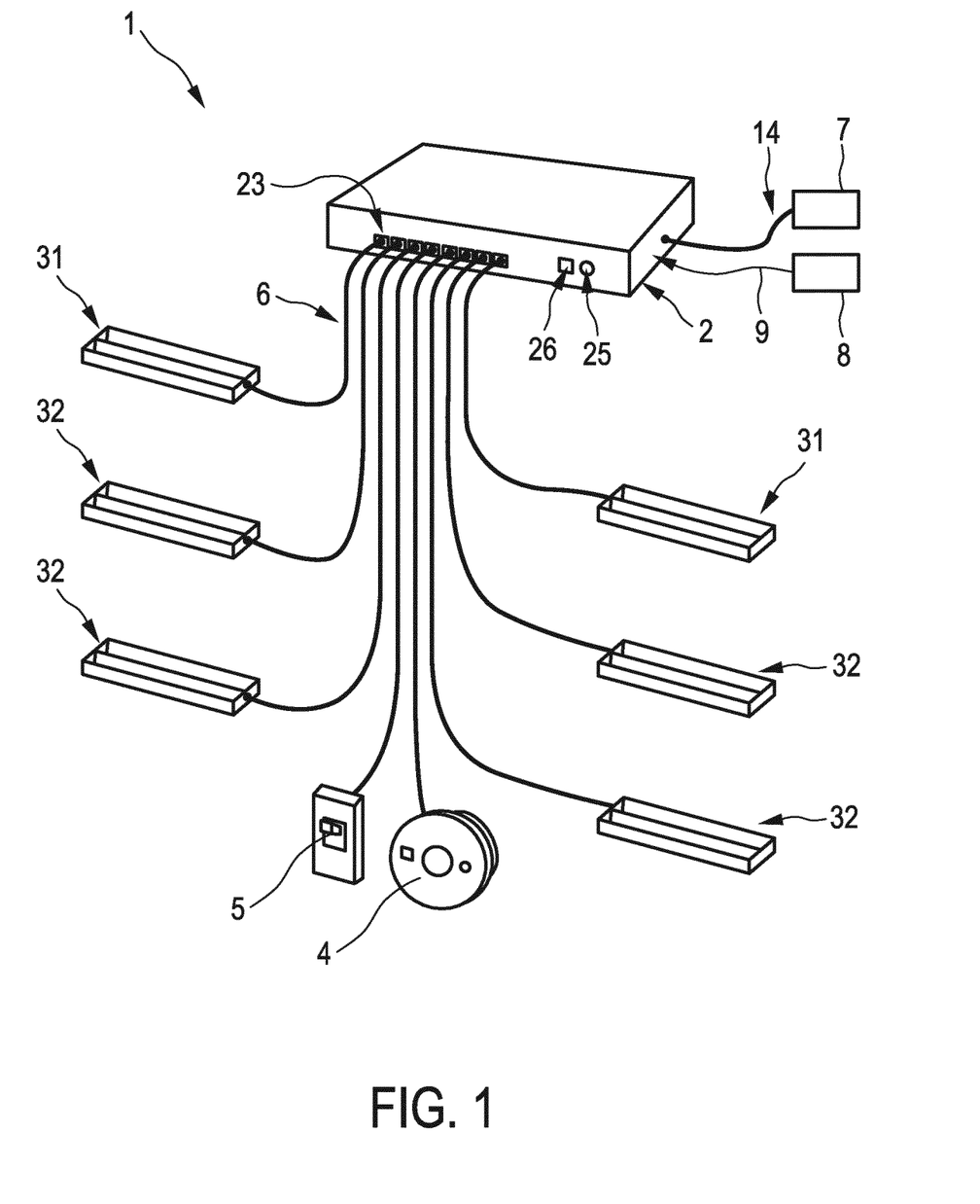
FIG. 1 shows schematically and exemplarily an embodiment of a PoE lighting system.

FIG. 1 shows schematically and exemplarily an embodiment of a PoE lighting system 1 comprising a PSE device 2 and several lighting units 31, 32. The lighting units 31, 32 are PDs in accordance with the PoE standard, for instance, in accordance with the PoE standard IEEE 802.3af and/or the PoE standard IEEE 802.3at. The lighting units 31, 32 are connected to ports 23 of the PSE device 2 via Ethernet cables 6. The Ethernet cables 6 may be category 3, 5 or 6 cables, or other cables usable for Ethernet communication. As further PDs 4, 5, which are also in accordance with the PoE standard, a sensor 4 and a hand switch 5 are connected to the ports 23 via the Ethernet cables 6.

The PSE device 2 is connected to a power providing system 7 which either provides primary input power or backup input power. In this embodiment the primary input power is AC mains power, being, for instance, 230 V AC power and the backup input power is DC power within a range of, for instance, 200 to 250 V. For connecting the power providing system 7 to the PSE device 2 a cable 14 is used. Moreover, the PSE device 2 is connected to a building control system 8 via an Ethernet connection 9.

Figure 2:
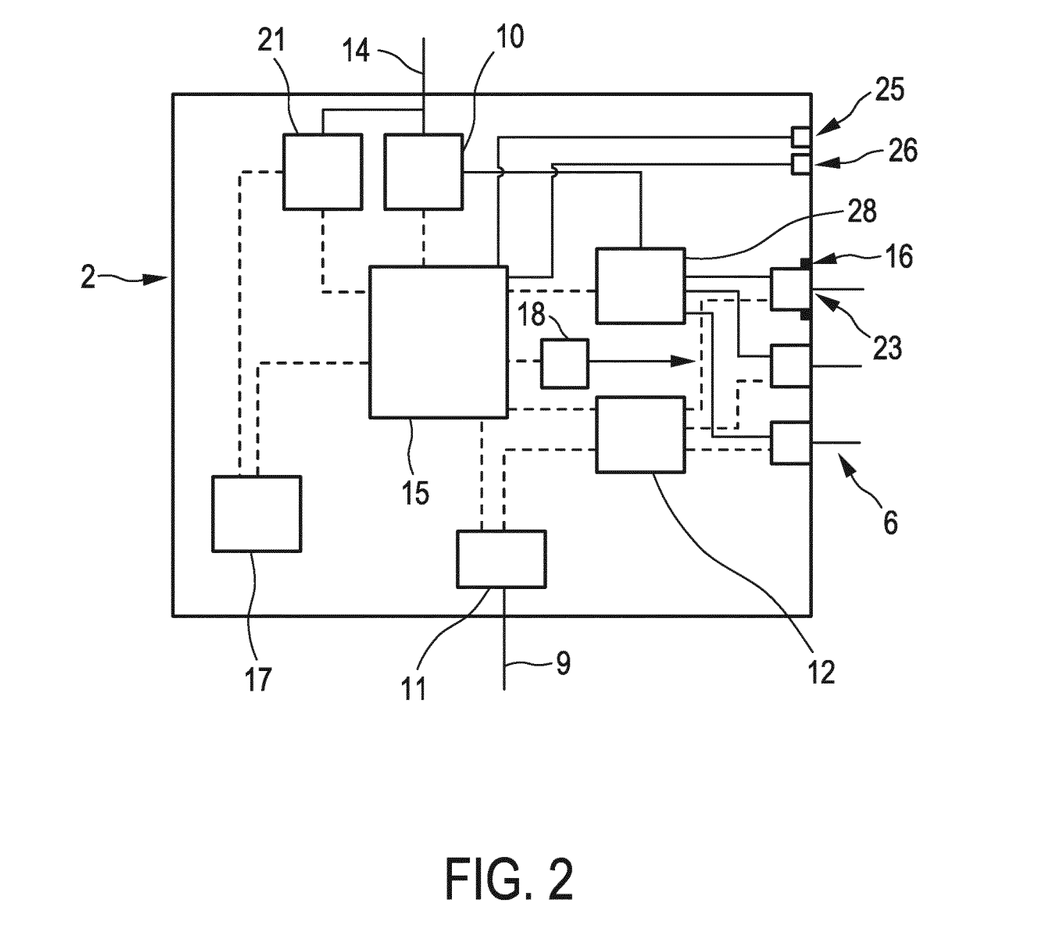
FIG. 2 shows schematically and exemplarily an embodiment of a PSE device of the PoE lighting system.

The PSE device 2 is schematically and exemplarily shown in more detail in FIG. 2. The PSE device 2 comprises a power converter 10 for converting the AC mains power received via the cable 14 to DC power, wherein the converted DC power is provided to a power distribution unit 28. The PSE device 2 further comprises a power detection unit 21 for detecting whether the input power received via the cable 14 is the primary input power i.e. in this embodiment the AC mains power, or the backup input power, i.e. in this embodiment the DC power. If it is detected that the received input power is the DC backup input power, the power converter 10 does preferentially not convert the input power, but just conducts the input power to the power distribution unit 28. However, it is also possible that the power converter 10 converts the received DC backup input power to a desired DC power value, whereupon the converted DC power is provided to the power distribution unit 28. The power distribution unit 28 distributes the power among the ports 23 and hence among the lighting units 31, 32 and the further PDs 4, 5. In FIG. 2 from the eight ports 23 shown in FIG. 1 only three ports 23 are shown for clarity reasons. The PSE device 2 can of course comprise less or more ports.

Since the power converter 10 and the power distribution unit 28 provide the output power to the lighting units 31, 32 and to the further PDs 4, 5 via the ports 23, the power converter 10 and the power distribution unit 28 can be regarded as forming an output power providing unit for providing output power to the lighting units 31, 32 and the further PDs 4, 5 based on the received input power.

The PSE device 2 further comprises a communication unit 11 for communicating with the building control system 8 via the Ethernet cable 9 and a communication unit 12 for communicating with the lighting units 31, 32 and the further PDs 4, 5 via the Ethernet cables 6. The PSE device 2 also comprises a control unit 15 for controlling the several components of the PSE device 2. The control unit 15 is especially adapted to control the power consumption of the lighting units 31, 32 and optionally also of the further PDs 4, 5 depending on whether the power received from the power providing system 7 via the cable 14 is the primary input power or the backup input power.

Figure 3:
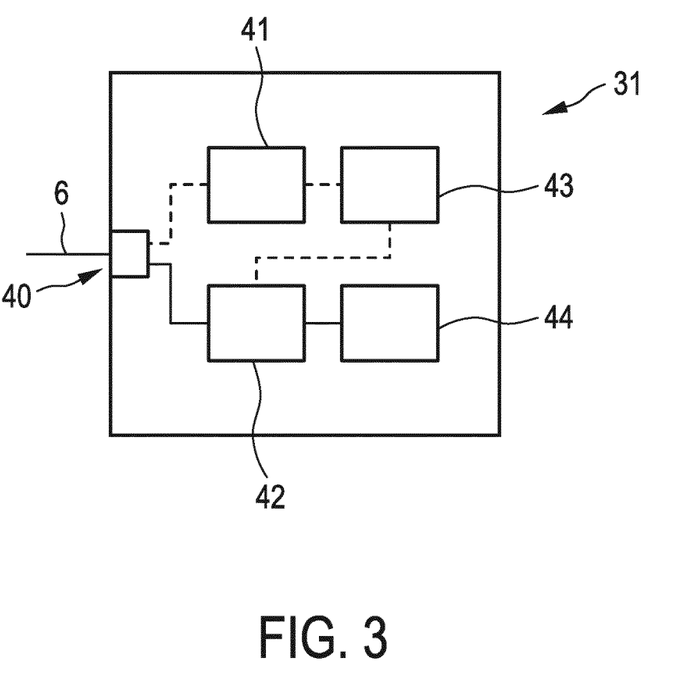
FIG. 3 shows schematically and exemplarily an embodiment of a lighting unit of the PoE lighting system.

FIG. 3 shows schematically and exemplarily an embodiment of one of the lighting units. The lighting unit 31 comprises a connector 40 to which the Ethernet cable 6 is connected. The lighting unit 31 further comprises a communication unit 41 for communicating with the PSE device and a driver 42 for driving a light source 44 like a light emitting diode. Moreover, the lighting unit 31 comprises a control unit 43 for controlling the communication unit 41 and the driver 42. The other lighting units 32 can have the same structure as the lighting unit 31 schematically and exemplarily shown in FIG. 3.

In an embodiment the control unit 15 of the PSE device 2 is adapted to control the power consumption of the lighting units 31, 32 by sending control data to the lighting units 31, 32. In particular, the control unit 15 may be adapted to send control data to the lighting units 31, 32 via the communication unit 12, which define the desired behavior of the lighting units 31, 32 in case of emergency, if the power detection unit 21 has detected that the received input power is the backup input power. For instance, the control unit 15 can send control data to the lighting units 32, which may be regarded as being non emergency lighting units, in order to request these lighting units 32 to be switched off. Moreover, the control unit 15 can send control data to the lighting units 31, which request the lighting units 31 to still provide light, maybe with a reduced light intensity, if the power detection unit 21 has detected that the received input power is a backup input power, i.e. the lighting units 31 may be regarded as being emergency lighting units. Thus, the control unit 15 can be adapted to control the lighting units 31, 32 by sending control data to the lighting units 31, 32 such that in case of emergency the emergency lighting units 31 still provide light and the non emergency lighting units 32 are switched off.

Instead of directly controlling the lighting units 31, 32 by requesting certain light intensity values or by requesting that the respective lighting unit should be switched off, the control data can also be indirect control data, i.e. the control data may just inform the lighting units 31, 32 that backup input power has been detected, whereupon the emergency lighting units 31 may enter, for instance, an emergency mode, in which light is still provided, but with a reduced light intensity, and the non emergency lighting units 32 may switch off themselves. In particular, the lighting units 31, 32 may be adapted to be operated in a first mode, which may be regarded as being a normal operation mode and in which the lighting units 31, 32 consume first power, and in a second mode, which may be regarded as being an emergency mode and in which the lighting units 31, 32 consume second power being smaller then the first power or no power, wherein the control unit 15 can be adapted to send control data to the lighting units 31, 32, which indicate that the lighting units 31, 32 should be operated in their second modes, if the power detection unit 21 has detected that the received input power is the backup input power. The second mode of the emergency lighting units 31 may be such that light is still provided, but with a reduced light intensity. For the non emergency lighting units 32 the second mode may just be a mode in which they do not consume any power, i.e. for these lighting units 32 the second mode may be a switch-off mode.

In an embodiment the control unit 15 is adapted to send information data to a lighting unit 31 connected to a port, to which power will be provided, if the power detection unit 21 detects that the received input is the backup input power, wherein the information data indicates to the lighting unit 31 that it is connected to the port to which power will be provided in case of emergency. Thus, if a lighting unit 31, 32 is connected to a port of the PSE device 2, the PSE device 2 may inform the lighting unit 31, 32 whether it should act as an emergency lighting unit or not in case of emergency. The control unit 15 is then preferentially further adapted to inform all lighting units 31, 32 that backup input power has been detected by sending corresponding control data to the lighting units 31, 32, whereupon the lighting units 31, which had been informed that they should act as emergency lighting units, switch to their emergency modes, in which light is still provided with reduced light intensity, and the other lighting units 32, which had been informed that they should act as non emergency lighting units, switch off themselves.

The control unit 15 can also be adapted to control the power consumption of the lighting units 31, 32 depending on whether the received input power is the primary input power or the backup input power by controlling the power distribution unit 28. In particular, the control unit 15 can be adapted to control the power distribution 28 such that, if the power detection unit 21 has detected that the received input power is the backup input power, only the ports 23, to which the emergency lighting units 31 are connected, receive output power such that in case of emergency only the emergency lighting units 31 provide light, but not the further lighting units 32. It can be predefined to which ports output power is provided, if it is detected that the received input power is the backup input power, and to which ports output power is not provided, i.e. emergency ports and non emergency ports can be predefined. The PSE device 2 can comprise indications 16 for indicating the predefined emergency ports. For instance, ring-like indications may surround the emergency ports, wherein these ring-like indications may be colored or they may not be colored. The indications for indicating the emergency ports can of course also have another shape. For example, a dot, a line or another marker may be arranged on the outside of the PSE device 2 close to the respective emergency port.

In an embodiment the control unit 15 may be adapted to randomly determine to which ports 23 the output power should be provided, if the power detection unit 21 detects that the received input power is the backup input power. Thus, it may be randomly determined which lighting units should act as emergency lighting units and which lighting units should not act as emergency lighting units in case of emergency. Moreover, in an embodiment the control unit 15 is adapted such that the ports 23 to which the output power should be provided, if the power detection unit 21 detects that the received input power is the backup input power, are selectable. Thus, the control unit 15 can be adapted such that it is selectable which ports 23 are emergency ports and which ports are not emergency ports. For instance, the building control system 8 may send instruction data to the control unit 15 via the Ethernet connection 9 and the communication unit 11 of the PSE device 2, wherein the instruction data contain instructions defining which ports 23 should be selected as being emergency ports. A user may input the desired emergency ports into the building control system 8, whereupon the building control system 8 sends corresponding instruction data to the control unit 15 of the PSE device 2. The emergency ports may also be selectable in another way. For instance, the PSE device 2 may comprise an input unit for allowing a user to directly select which ports should be emergency ports. It is also possible that instruction data instructing the control unit 15 of the PSE device 2, which ports should be emergency ports, are sent to the control unit 15 of the PSE device 2 by using another unit which has a data connection to the PSE device 2 and which allows a user to enter which ports should be emergency ports. This other unit can be, for instance, a mobile input unit like a mobile computer, wherein the mobile computer may be a mobile phone, a laptop or another mobile computer.

The PSE device 2 further comprises a power budget value providing unit 17 for providing a power budget value being indicative of a maximal output power providable by the power converter 10 and the power distribution unit 28 to the ports 23, if the PSE device 2 receives the backup input power. Moreover, the PSE device 2 comprises a power monitoring unit 18 for monitoring the power consumed by the lighting units 31, 32 and the further PDs 4, 5. The power monitoring unit 18 is a unit for measuring the power at the ports 23. For instance, the power monitoring unit 18 can be adapted to measure the voltage and the current at each port 23. The control unit 15 can be adapted to control the power consumption of the lighting units 31, 32 based on the provided power budget value and the monitored consumed power, if the power detection unit 21 has detected that the received input power is the backup input power. This control of the power consumption of the lighting units 31, 32 can be performed by sending control data to the lighting units 31, 32, wherein the control data are indicative of the power to be consumed by the respective lighting units 31, 32, and/or by controlling the power distribution unit 28. The power budget value can be predefined, if it is known which backup input power will be available, if the primary input power cannot be provided anymore. This predefined power budget value can be stored in the power budget value providing unit 17, in order to allow the power budget value providing unit 17 to provide the power budget value, if the PSE device 2 receives the backup input power. However, in an embodiment the power budget value providing unit 17 may also be adapted to receive information about the amount of the backup input power, which is really received by the PSE device 2, from the power detection unit 21 and to provide the power budget value based on the received information.

The control unit 15 can be adapted to control the power consumption of the lighting units 31, 32 based on the provided power budget value and the monitored consumed power such that, in case of emergency, the emergency lighting units can be operated in their emergency mode, in which they still provide light, and the other PDs only consume power, if the power budget value indicates sufficient power. In an embodiment the power detection unit 21 may continuously monitor the received backup input power, in order to allow for a continuous provision of the power budget value, wherein the control unit 15 may be adapted to dynamically control the consumption of the lighting units 31, 32 and optionally also of the further PDs 4, 5 depending on the currently provided power budget value.

The control unit 15 may be adapted to store last control data, which have been sent to the lighting units 31, 32 before the power detection unit 21 has detected that the received input power is the backup input power and before the control unit 15 has controlled the power consumption of the lighting units 31, 32 depending on the detection of the backup input power. Moreover, the control unit 15 can be adapted to send the stored control data again to the lighting units 31, 32, if after the detection of the backup input power the primary input power is again detected. In particular, if non emergency lighting units 32 have been switched off, while the backup input power had been detected, they may have forgotten their state of operation they were in when the backup input power was detected. By sending the last control data, which can also be regarded as being control messages, to these non emergency lighting units they can get back to their last state of operation.

In an embodiment the control unit 15 is adapted to receive backup information from the lighting units 31, 32, wherein the backup information is indicative of how the lighting units 31, 32 should be controlled by the control unit 15, if the power detection unit 21 has detected that the received input power is the backup input power. In particular, the information whether a lighting unit is an emergency lighting unit or a non emergency lighting unit can be stored in the respective lighting unit, wherein the respective lighting unit can send to the PSE device 2 at, for instance, power up this information, in order to let the PSE device 2 know whether the respective lighting unit is an emergency lighting unit or a non emergency lighting unit. The control unit 15 may then control the power consumption of the lighting units depending on the received information which lighting unit is an emergency lighting unit and which lighting unit is not an emergency lighting unit. For instance, based on this information the control unit 15 can control the lighting units such that the emergency lighting units 31 receive output power and the non emergency lighting units 32 do not receive output power, if the power detection unit 21 detects the backup input power. Thus, the PSE device 2, especially the control unit 15, may be modified by control data, i.e. messages, coming from the lighting units. An installer may therefore place special emergency lighting units where required and they will identify themselves to the PSE device 2. The lighting units 31, 32 may comprise a user operable button or another input unit which allows a user like an installer to configure whether the respective lighting unit should be controlled as an emergency lighting unit or a non emergency lighting unit. The respective lighting unit can then send corresponding backup information to the control unit, in order to inform the control unit whether the lighting unit has been configured to be controlled as an emergency lighting unit or as a non emergency lighting unit.

In the control unit 15 an emergency table can be stored, wherein the emergency table may comprise assignments defining which of the ports 23 are emergency ports and which of the ports 23 are non emergency ports. This emergency table may be filled and/or amended based on, for instance, data coming from the lighting units 31, 32, which indicate whether the respective lighting unit 31, 32 is an emergency lighting unit or a non emergency lighting unit, like the backup information.

The PSE device 2 may be adapted to be operable in a test mode, in which the control unit 15 controls the power consumption of the lighting units 31, 32 as if the power detection unit 21 had detected that the received input power is backup input power. For instance, the control unit 15 may be adapted to receive backup test data and to control the lighting units 31, 32 as if the power detection unit 21 had detected that the received input power is backup input power, if the control unit 15 has received the backup test data. Thus, the control, which is performed, if the power detection unit 21 has detected that the received input power is the backup input power and which may be regarded as being a control in an emergency mode of the PSE device 2, may also be performed, if the control unit 15 receives the backup test data. The emergency mode may therefore not only be entered, when the backup input power, i.e. in this embodiment the DC supply, gets detected, but the emergency mode may also be initiated through data packets. Instead of sending backup test data, a button 25 may be used by an installer to manually switch the PSE device to the emergency mode and back into the normal operation mode, wherein in this test emergency mode the control unit 15 controls the lighting units 31, 32 as if the power detection unit 21 had detected that the received input power is the backup input power. This allows testing the light intensities in emergency situations in a very simple way. The PSE device 2 may comprise a signal lamp 26 for indicating that the PSE device 2 is in its emergency mode.

The control unit 15 is preferentially also adapted to control the power consumption of the further PDs 4, 5. Preferentially, the further PDs 4, 5 are controlled like the non emergency lighting units 32 in case of emergency. In particular, the further PDs 4, 5 are preferentially controlled such that they are switched off or are in a standby mode, if it has been detected that the backup input power is received.

Figure 4:
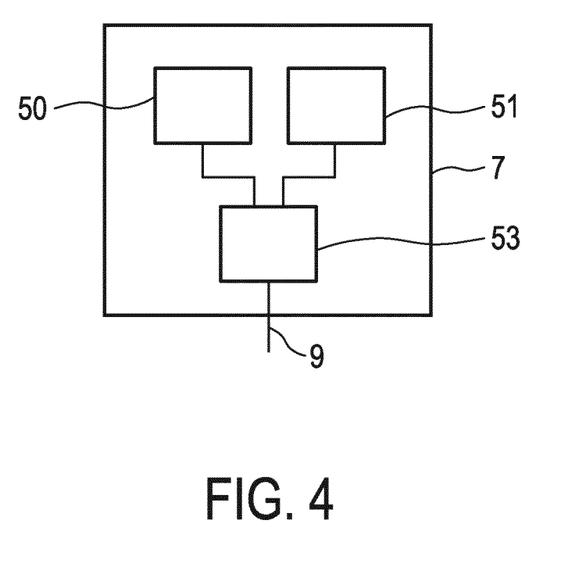
FIG. 4 shows schematically and exemplarily an embodiment of a power providing system providing either primary input power or backup input power.

FIG. 4 shows schematically and exemplarily the power providing system 7 in more detail. The power providing system 7 comprises a primary input power source 50, a backup input power source 51 and a switching unit 53. The primary input power source 50 is preferentially an AC mains power source delivering 230 V. The backup input power source 51 is preferentially adapted to provide DC voltage within a range of 200 to 250 V. Preferentially, the backup input power source 51 comprises a battery bank for providing the DC backup input power. The battery bank may comprise, for instance, 18 batteries, wherein each battery provides 12 V. However, the battery bank can of course also comprise another arrangement of batteries. For instance, it can comprise 102 batteries, wherein each battery may provide 2 V. The switching unit 53 comprises a relay and is adapted to generally connect the primary input power source 50 to the cable 9 and to connect the backup input power source 51 to the cable 9, if the primary input power source 50 cannot provide the primary input power any more, i.e., for instance, when mains vanishes. The power providing system 7 may be in accordance with the European standard EN50171-2001.

Figure 5:
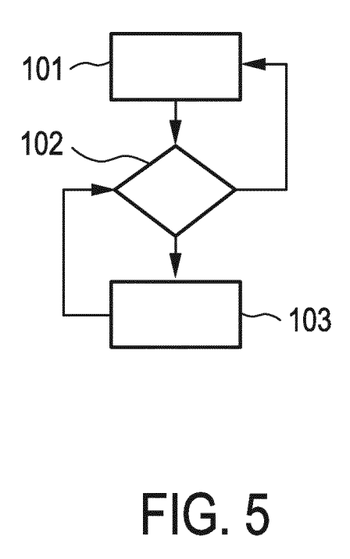
FIG. 5 shows a flowchart exemplarily illustrating an embodiment of a method for providing power by using the PSE device.

In the following an embodiment of a method for providing power to the lighting units 31, 32 and also to the sensor 4 and the hand switch 5 will be exemplarily described with reference to a flowchart shown in FIG. 5.

In step 101 the PSE device 2 receives the primary input power from the power control system 7 and the control unit 15 of the PSE device 2 controls the power consumption of the lighting units 31, 32, the sensor 4 and the hand switch 5. In particular, the control unit 15 can control the power distribution unit 28 and/or send control data to the lighting units 31, 32, the sensor 4 and the hand switch 5, in order to control the power consumption of these PDs, particularly in accordance with power requests received from these PDs. The mode of the PSE device 2, in which the PSE device 2 behaves in this way and receives the primary input power, may be regarded as being a normal operation mode of the PSE device 2.

In this normal operation mode the power detection unit 21 measures the received input power, wherein in step 102 the power detection unit 21 determines whether the received measured input power is the primary input power or the backup input power. If the received input power is still the primary input power, the PSE device 2 remains in its normal operation mode. However, if the received input power is the backup input power, the PSE device 2 is switched into its emergency mode in which the control unit 15 controls the power consumption of the lighting units 31, 32, the sensor 4 and the hand switch 5 differently (step 103). In particular, the control unit 15 is adapted to control the power consumption of the lighting units 31, 32, the sensor 4 and the hand switch 5 such that the consumed power is reduced in comparison to the power consumed in the normal operation mode. For instance, in the emergency mode the control unit 15 can control the power consumption by switching off the non emergency lighting units 32, the sensor 4 and the hand switch 5 such that only the emergency lighting units 31 provide light, maybe with a reduced dimmed light intensity only. However, it is also possible that the emergency lighting units 31 provide their maximum light intensity in case of emergency.

Also in step 103, i.e. while the PSE device 2 is in its emergency mode, the power detection unit 21 measures the power received from the power providing system 7 and determines in step 102 whether the received input power is still the backup input power or the primary input power. If the received input power is still the backup input power, the PSE device 2 remains in its emergency mode, whereas, if the received input power is the primary input power, the PSE device 2 is switched again to its normal operation mode (step 101). If, for instance, in the emergency mode only the emergency lighting units 31 were switched on, now in the normal operation mode also the other PDs 32, 4, 5 are switched on. Thus, whenever the backup input power is detected, the emergency control management starts, in which, for instance, only the emergency lighting units are switched on, i.e., if the emergency lighting units are connected to emergency ports, only the emergency ports get power in the emergency mode of the PSE device and the other ports do not get power. If the primary input power is again detected, all ports may be turned on, i.e. may receive output power again.

By using the above described emergency operation feature of the PSE device an emergency lighting mechanism can be provided, that does not necessarily need dedicated emergency wiring for the emergency lighting units and distributed batteries for providing power to the emergency lighting units in case of emergency. The PoE standard, especially the PoE standard IEEE 802.3af and IEEE 802.3at, does not specify emergency operation neither for IT applications nor for PoE lighting systems. Known PSE devices are therefore not able to handle, for instance, a DC emergency supply in accordance with, for example, the European standard EN50171-2001. In emergency situations all measures have to be taken, in order to have minimal light levels in, for instance, a building during AC mains power outage. If for this emergency situation a centralized emergency supply is present, this centralized emergency supply cannot be loaded with all lighting units. For this reason the control unit of the PSE device 2 is adapted to control the power consumption of the lighting units in such emergency situations. In particular, the control unit 15 is adapted to deactivate all surplus loads and to trim light levels down to predefined required values. Since the power detection unit of the PSE device directly detects whether the received input power is the primary input power or the backup input power, wherein the PSE device is controlled depending on this detection, it is not necessary to use any signaling system for signaling to the PSE device that it should be operated in an emergency mode.

The PSE device, especially the control unit of the PSE device, can be adapted to simply cut off the power for all ports, which are not emergency ports, whenever the backup input power, especially the DC supply, is detected. After the primary input power is detected again, especially after AC mains power is detected again, these ports can get enabled again, in order to resume normal operation. The power distribution unit 28 can comprise isolation switches, i.e. for each port 23 a single isolation switch, in order to disable and enable the different ports individually. The assignments defining which port should be regarded as being an emergency port and which port should not be regarded as being an emergency port can be stored in an emergency table in the PSE device, especially in the control unit of the PSE device, or in a storing unit of the PSE device. In particular, isolation switches of the power distribution unit may be controlled depending on the emergency table, if the power detection unit 21 has detected that the received input power is the backup input power.

The emergency table can be randomly filled with assignments defining which ports should act as emergency ports and which ports should not act as emergency ports in case of emergency. However, these assignments can also be predefined, i.e. the emergency table can comprise predefined assignments defining which ports should be regarded as being emergency ports and which ports should not be regarded as being emergency ports. This allows installing the PSE device without any configuration regarding the emergency case, wherein still emergency functionality is available. After accidental memory loss of the PSE device, the PSE device can automatically determine which ports should act as emergency ports and which ports should not act as emergency ports depending on the random population of the emergency table or depending on predefined assignments defined by the emergency table. The predefined assignments in the emergency table or the random assignments in the emergency table, respectively, can be overwritten based on messages received from, for instance, the building control system. Also a commissioner of the PoE lighting system can be able to overwrite the entries in the emergency table.

In an embodiment the PSE device has a number of ports that are predefined as emergency ports, wherein these ports may be marked, for instance, by colors at the connectors. If the installer always populates these emergency ports first, a minimum flux level can be guaranteed as these first connected lighting units keep on, if the PSE device is in its emergency mode. The PSE device can also be adapted to inform the lighting units of the fact that they are connected to the emergency ports through a data link by means of dedicated data packets. This allows these lighting units to dim themselves to a lower setting during emergency to not overtax the power provision by the PSE device. Moreover, in an embodiment the PSE device has a present power budget to be given out during emergency operation. The PSE device may monitor the power at the ports, in order to sum up all the power consumed by all its loads. The PSE device may be adapted to assure that not more power is being consumed in total than the emergency budget allows by influencing the loads, especially the lighting units, connected to the ports. This allows, for instance, adjusting the dim level for emergency operation dynamically which would allow reaching optimal flux level even if a lighting unit may be defective and not working. As an alternative to controlling the PDs, especially the lighting units, by means of dim commands, switch-on commands and switch-off commands, the PSE device may also switch as many ports off as required to keep within the emergency budget.

The emergency configuration, which defines which lighting units are emergency lighting units, can be stored in the PSE device, especially in the emergency table, but it is also possible to store this configuration in the lighting units. The advantage of storing the configuration in the lighting units is that the PSE device does not need to be configured, whereas configuring the settings of the lighting units is done anyhow during commissioning. Thus, it is not required to perform an additional working step for configuring the PSE device. During commissioning of the lighting units, a lighting unit may be configured as being an emergency lighting unit by sending a corresponding configuration command over the network to the respective lighting unit. However, a lighting unit may also be configured as being an emergency lighting unit or a non emergency lighting unit in another way. For instance, the lighting units may have an input unit like a button, which is operable by an installer, in order to allow the installer to input whether the respective lighting unit should be operated as an emergency lighting unit or a non emergency lighting unit.

The PSE device can be adapted to generate control packets towards the lighting units, i.e. to send control data to the lighting units, to notify an emergency situation. These control packets can just contain the information that an emergency situation has occurred, i.e. that the backup input power has been received by the PSE device, whereupon emergency lighting units may control themselves to be operated in a full light intensity mode or a dim level mode and the non emergency lighting units may control themselves to be switched off or be in a standby mode. This allows keeping all ports of the PSE device active and still drastically reducing the power consumption. In an embodiment all lighting units may be adapted to be operable in a normal operation mode and in an emergency mode, wherein in the normal operation mode a higher light intensity is provided than in the emergency mode. If it is detected that the input power is the backup input power, i.e. if an emergency situation is detected, the PSE device may signal the control packets to all lighting units or only to certain lighting units, wherein all lighting units, to which the control packets have been signaled, will operate in their emergency modes, in order to reduce the overall power consumption.

The control data sent by the PSE device, in particular, by the control unit of the PSE device, to the lighting units in case of emergency can be control messages influencing the lighting units towards normal full intensity operational on-mode, a dim level mode or an off-mode, in order to generate a predefined specific emergency lighting scene, which may be predefined by an installer or by another person, for instance, via the building control system. Thus, the specific emergency lighting scene may be programmable in the PSE device, in order to keep the emergency lighting scene flexible after installation.

In an embodiment the PoE lighting system preferentially comprises emergency lighting units and non emergency lighting units, wherein, if an emergency lighting unit receives control data informing the emergency lighting unit that the backup input power has been received by the PSE device, the emergency lighting unit controls itself to be in an emergency mode in which light is still provided, but with a reduced light intensity. If a non emergency lighting unit has received control data informing that an emergency situation has occurred, i.e. that the backup input power has been received by the PSE device, the non emergency lighting unit shows a behavior which is different to the behavior of the emergency lighting unit. In particular, the non emergency lighting unit switches itself off or controls itself to be in a standby mode in which components other than light sources of the lighting units may be still active. For instance, in the standby mode the control unit, the communication unit and optional further units like a sensor, which may also be integrated in a non emergency lighting unit, may still be active.

The PSE device may be adapted to provide a remote diagnostic procedure of the emergency functionality by reading out the actual status of the detection of the received input power through Ethernet messages. In this way, the change over from receiving the primary input power to receiving the backup input power and vice versa can be monitored remotely through, for instance, a building control system or a building management system.

Although in above described embodiments several emergency lighting units and several non emergency lighting units are connected to a PSE device, in other embodiments a) only one emergency lighting unit and one or several non emergency lighting units or b) only one non emergency lighting unit and one or several emergency lighting units may be connected to the PSE device.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the sending of control data to the lighting units, the control of the power distribution unit, the provision of the power budget value, the storing of last control data, the receiving of backup information from the lighting units, the receiving of backup test data, et cetera performed by one or several units can be performed by any other number of units or devices. These procedures and/or the control of the PSE device in accordance with the method for providing power by using a PSE device can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a PSE device to be used in a PoE lighting system, wherein the PSE device is adapted to receive input power from a power providing system. The PSE device comprises a power detection unit for detecting whether the received input power is primary input power or backup input power, wherein the PSE device is adapted to control the power consumption of lighting units depending on the power detection. This allows for an indication of an emergency situation, in which the backup input power is provided, to the PSE device without necessarily requiring data communication means. Moreover, the power consumption of the lighting units can be more efficiently utilized in case of emergency.

The invention claimed is:

1. A power source equipment, PSE, device to be used in a Power over Ethernet, PoE, lighting system, wherein the PSE device is adapted to receive input power from a power providing system which is adapted to provide primary input power or backup input power, the PSE device comprising:
    a power detection unit for detecting whether the received input power is the primary input power or the backup input power, without requiring data communication with any external device,
    an output power providing unit for providing output power to lighting units based on the received input power,
    a control unit for controlling the power consumption of the lighting units depending on whether the received power is the primary input power or the backup input power, and
    a communication unit for communicating data with the lighting units;
    wherein the control unit controls the power consumption of the lighting units by controlling the output power providing unit,
    wherein the output power providing unit comprises several ports to be connected to several lighting units for providing the output power to the several lighting units, wherein the control unit controls the output power providing unit such that output power is not provided to all ports if the power detection unit has detected that the received input power is the backup input power, and
    wherein the control unit receives backup information from a respective lighting unit, wherein the backup information is indicative of how the lighting unit should be controlled by the control unit if the power detection unit has detected that the received input power is the backup input power.

2. The PSE device as defined in claim 1, wherein the PSE device comprises:
    a processor configured to provide a power budget value being indicative of the maximal output power providable by the output power providing unit if the PSE device receives the backup input power, and
    a power monitoring unit for measuring the power consumed by the lighting units,
    wherein the control unit controls the power consumption of the lighting units based on the provided power budget value and the measured consumed power if the power detection unit has detected that the received input power is the backup input power.

3. The PSE device as defined in claim 2, wherein the processor configured to provide a power budget value comprises a device for measuring actually received backup input power.

4. The PSE device as defined in claim 1, wherein the control unit comprises a processor configured to:
    store last control data, which have been sent to the lighting units before the power detection unit has detected that the received input power is the backup input power and before the control unit has controlled the power consumption of the lighting units depending on the detection of the backup input power, and
    send the stored control data again to the lighting units, if after the detection of the backup input power the primary input power is again detected.

5. The PSE device as defined in claim 1, wherein the PSE device is operable in a test mode, in which the control unit controls the power consumption of the lighting units as if the power detection unit had detected that the received input power is backup input power.

6. The PoE lighting system as defined in claim 1 comprising:
    lighting units,
    the PSE device as defined in claim 1, wherein the output power providing unit of the PSE device provides the output power to the lighting units.

7. A method for providing power by using the PSE device as defined in claim 1 in the PoE lighting system, the method comprising:
    receiving input power from the power providing system, which is adapted to provide primary input power or backup input power, by the PSE device,
    detecting whether the received input power is the primary input power or the backup input power by the power detection unit contained within the PSE device,
    providing output power to lighting units based on the received input power by the output power providing unit of the PSE device, wherein the power consumption of the lighting units is controlled by the control unit of the PSE device depending on whether the received power is the primary input power or the backup input power.

8. A non-transitory computer readable medium comprising computer executable instructions that when executed perform the method as defined in claim 7.

9. The PSE device as defined in claim 1, wherein the control unit controls the power consumption of at least one of the lighting units by sending via a communication unit, control data to the lighting unit; and wherein the power consumption of the lighting unit is controlled by the lighting unit, based at least in part on the received control data.

10. The PSE device as defined in claim 9, wherein at least one of the lighting units is operable in a first mode, in which the lighting unit consumes first power, and in a second mode, in which the lighting unit consumes second power, the second power being greater than zero and smaller than the first power, wherein the control unit sends control data to the at least one lighting unit, which indicate that the lighting unit should be operated in its second mode if the power detection unit has detected that the received input power is the backup input power.

11. The PSE device as defined in claim 9, the communication unit, configured to:
 send information data to a lighting unit connected to an output power providing unit port, to which power will be provided if the power detection unit detects that the received input power is the backup input power, wherein the information data indicates that the lighting unit is connected to the port to which power will be provided if the power detection unit detects that the received input power is the backup input power, and
 send control data to the lighting unit informing the lighting unit that backup input power has been detected, in order to allow the lighting unit to control itself based on the knowledge that power will still be provided and backup input power has been detected.

12. The PSE device as defined in claim 1, wherein the backup information comprises whether the respective lighting unit contains a designation that the respective lighting unit is an emergency lighting unit.

13. The PSE device as defined in claim 12, wherein said designation is set by activating an input device on the lighting unit.

14. A power source equipment, PSE, device to be used in a Power over Ethernet, PoE, lighting system, wherein the PSE device is adapted to receive input power from a power providing system which is adapted to provide primary input power or backup input power, the PSE device comprising:
 a power detection unit for detecting whether the received input power is the primary input power or the backup input power, without requiring data communication with any external device,
 an output power providing unit for providing output power to lighting units based on the received input power, and
 a control unit for controlling the power consumption of the lighting units depending on whether the received power is the primary input power or the backup input power,
 wherein the control unit controls the power consumption of the lighting units by controlling the output power providing unit, and
 wherein the output power providing unit comprises several ports to be connected to several lighting units for providing the output power to the several lighting units, wherein the control unit controls the output power providing unit such that such that output power is not provided to all ports if the power detection unit has detected that the received input power is the backup input power;
 wherein the control unit receives backup information from a respective lighting unit, wherein the backup information is indicative of how the lighting unit should be controlled by the control unit if the power detection unit has detected that the received input power is the backup input power;
 wherein the PSE device further comprises:
  a processor configured to provide providing a power budget value being indicative of the maximal output power providable by the output power providing unit if the PSE device receives the backup input power, and
  a power monitoring unit for measuring the power consumed by the lighting units,
  wherein the control unit controls the power consumption of the lighting units based on the provided power budget value and the measured consumed power if the power detection unit has detected that the received input power is the backup input power.

* * * * *